US012798131B2

(12) United States Patent
Zou et al.

(10) Patent No.: US 12,798,131 B2
(45) Date of Patent: Nov. 17, 2026

(54) VISUAL NASAL HAIR TRIMMER

(71) Applicant: JESHOME SMART TECHNOLOGY(SHENZHEN) CO., LTD, Shenzhen (CN)

(72) Inventors: David Zou, Shenzhen (CN); Dongping Su, Shenzhen (CN)

(73) Assignee: JESHOME SMART TECHNOLOGY(SHENZHEN) CO., LTD, Shenzhen (CN)

( * ) Notice: Subject to any disclaimer, the term of this patent is extended or adjusted under 35 U.S.C. 154(b) by 80 days.

(21) Appl. No.: 19/020,435

(22) Filed: Jan. 14, 2025

(65) Prior Publication Data

US 2026/0102933 A1 Apr. 16, 2026

(30) Foreign Application Priority Data

Oct. 14, 2024 (CN) ........................ 202411432090.1

(51) Int. Cl.

*B26B 19/14* (2006.01)
*B26B 19/38* (2006.01)
*H04N 7/18* (2006.01)
*B26B 19/46* (2006.01)

(52) U.S. Cl.

CPC .......... *B26B 19/148* (2013.01); *B26B 19/382* (2013.01); *B26B 19/3873* (2013.01); *H04N 7/183* (2013.01); *B26B 19/46* (2013.01)

(58) Field of Classification Search

CPC . B26B 19/148; B26B 19/382; B26B 19/3873; B26B 19/46; B26B 19/16; H04N 7/183

USPC .......................... 30/263–265, 173, 276, 29.5

See application file for complete search history.

(56) References Cited

U.S. PATENT DOCUMENTS

2007/0022605 A1* 2/2007 Morisugi .............. B26B 19/148 30/43.4
2010/0186234 A1* 7/2010 Binder ................... A45D 26/00 348/E5.022
2011/0072669 A1* 3/2011 Morisugi .............. B26B 19/148 30/29.5
2011/0232096 A1* 9/2011 Yabuuchi ................ B26B 19/38 30/29.5
2016/0008994 A1* 1/2016 Johnson .................. B26B 19/06 30/341
2022/0134585 A1* 5/2022 Yang ...................... A45D 24/10 30/200
2024/0261990 A1* 8/2024 Hallen ................... A61B 1/227

* cited by examiner

*Primary Examiner* — Phong H Nguyen
(74) *Attorney, Agent, or Firm* — HOWARD M COHN and Associates, LLC

(57) ABSTRACT

A visual nasal hair trimmer includes a housing. A protective cover is mounted at one end of the housing, the protective cover defines a plurality of nasal hair grooves, and a trimming cutter is arranged in the protective cover. A rotary driver connected to the trimming cutter is arranged in the housing. The rotary driver is connected to a main control module. The main control module is connected to a camera and is configured to transmit an image signal collected by the camera to a handheld terminal. The camera is located in a central cavity of the trimming cutter. A shooting hole is defined in the protective cover.

9 Claims, 9 Drawing Sheets

VISUAL NASAL HAIR TRIMMER

FIELD

The present disclosure relates to the field of personal cleaning tools, and in particular to a visual nasal hair trimmer.

BACKGROUND

Nasal hair trimmers are tools designed specifically for trimming and cleaning nasal hairs, which include manual and electric types. Manual nasal hair trimmers are typically small scissors or tweezers, which are prone to puncturing nostrils. Electric nasal hair trimmers trim nasal hairs using electrically rotated blades. However, in related art, the electric nasal hair trimmers have a tendency for the rotating blades to puncture inner walls of the nostrils during operation. Additionally, these devices lack visual functionality, preventing the user from viewing internal condition of a nasal cavity in real time. Thus, when trimming nasal hairs, the user relies entirely on tactile feedback and experience, which not only may result in incomplete trimming, but also poses a risk of accidental injury to nasal cavity lining, leading to pain or infection. Therefore, there is a significant room for improvement in the precision, safety, and user experience of the nasal hair trimmers in the related art.

SUMMARY

In view of the aforementioned problems, the present disclosure provides a visual nasal hair trimmer which is capable of preventing the puncturing of the nostrils, protecting the nasal cavity, and allowing real-time observation of the internal condition of the nasal cavity through a camera, thereby enabling precise trimming of nasal hairs and improving the user experience.

The present disclosure provides the following technical solutions. A visual nasal hair trimmer includes a housing. A protective cover is mounted at one end of the housing and defines a plurality of nasal hair grooves. A trimming cutter is arranged in the protective cover and is configured to trim nasal hairs in the plurality of nasal hair grooves. A rotary driver is arranged in the housing, connected to the trimming cutter, and configured to drive the trimming cutter to rotate. The rotary driver is connected to a main control module. The main control module is connected to a camera and is configured to transmit an image signal collected by the camera to a handheld terminal. The camera is located in a central cavity of the trimming cutter. The protective cover defines a shooting hole for the camera to shoot.

The protective cover includes a cover body. The trimming cutter is located in the cover body. A top of the cover body defines the shooting hole corresponding to the camera. A side wall of the cover body defines the plurality of nasal hair grooves. The trimming cutter includes a blade holder. The blade holder defines a central cavity corresponding to the shooting hole. The camera is located in the central cavity. The blade holder is arranged with at least one movable blade. The at least one movable blade is configured to trim nasal hairs entering the plurality of nasal hair grooves.

The cover body is arranged with a plurality of protection strips. Each of the plurality of nasal hair grooves is formed between respective two adjacent protection strips of the plurality of protection strips. The plurality of protection strips are bent inward to form a plurality of bent sections. Each of the plurality of bent sections is at a top of a respective one of the plurality of protection strips. The plurality of bent sections cooperatively define the shooting hole corresponding to the camera at a center of the cover body.

The blade holder includes a holder body. The holder body is arc shaped. A top of the holder body is arranged with at least one upper support arm. Each of the at least one upper support arm is arranged with a respective one of the at least one movable blade. A bottom of the holder body is arranged with at least one lower support arm. Each of the at least one lower support arm is arranged with a positioning seat for mounting.

The rotary driver is connected to the trimming cutter through an eccentric transmission mechanism. The eccentric transmission mechanism includes a driving gear rotating synchronously with a rotating shaft of the rotary driver, a transmission gear set meshed with the driving gear, and a driven gear seat meshed with the transmission gear set. The driven gear seat is connected to a rotating drum configured to rotate synchronously with the driven gear seat. The trimming cutter is mounted on the rotating drum. The transmission gear set is arranged on a side of the driving gear. The driven gear seat and the driving gear are arranged on a same axis.

The driven gear seat is arranged with at least two connecting posts. A bottom of the rotating drum defines at least two connecting grooves. Each of the at least two connecting posts corresponds to a respective one of the at least two connecting grooves. A top of the rotating drum defines at least one positioning groove for positioning the trimming cutter. A bottom of the blade holder of the trimming cutter is arranged with at least one positioning seat. Each of the at least one positioning seat matches a respective one of the at least one positioning groove. A top of the blade holder of the trimming cutter is arranged with the at least one movable blade.

A cutter head seat is movably mounted at the one end of the housing through an external connection seat. The protective cover is mounted on the cutter head seat. The plurality of protection strips of the protective cover pass through a cutter head hole of the cutter head seat. An internal connection seat and a mounting bracket are arranged in the housing. The internal connection seat is movably connected to the external connection seat. The rotary driver is arranged on the mounting bracket.

The main control module is connected to a battery, a charging interface, and a button. The charging interface is arranged at the other end of the housing. The button is arranged on the housing.

The main control module is configured to transmit the image signal to the handheld terminal by means of wireless transmission.

The housing is movably fitted with a cover body. The cover body sleeves the one end of the housing.

Compared with the prior art, the beneficial effects of the present disclosure are as follows. The present disclosure provides a visual nasal hair trimmer. The trimming cutter of the visual nasal hair trimmer are arranged in the protective cover, and the nasal hairs extending into the protective cover can be trimmed by the rotation of the trimming cutter, so as to prevent puncturing user's nostrils. Moreover, the camera is located in the central cavity of the trimming cutter and is connected to the handheld terminal. Through the hollow protective cover and the trimming cutter, the user can monitor the internal condition of the nasal cavity in real time through the handheld terminal during a process of trimming nasal hairs, thereby facilitating precise trimming of nasal hairs and improving the user experience.

DETAILED DESCRIPTION

Figure 1:
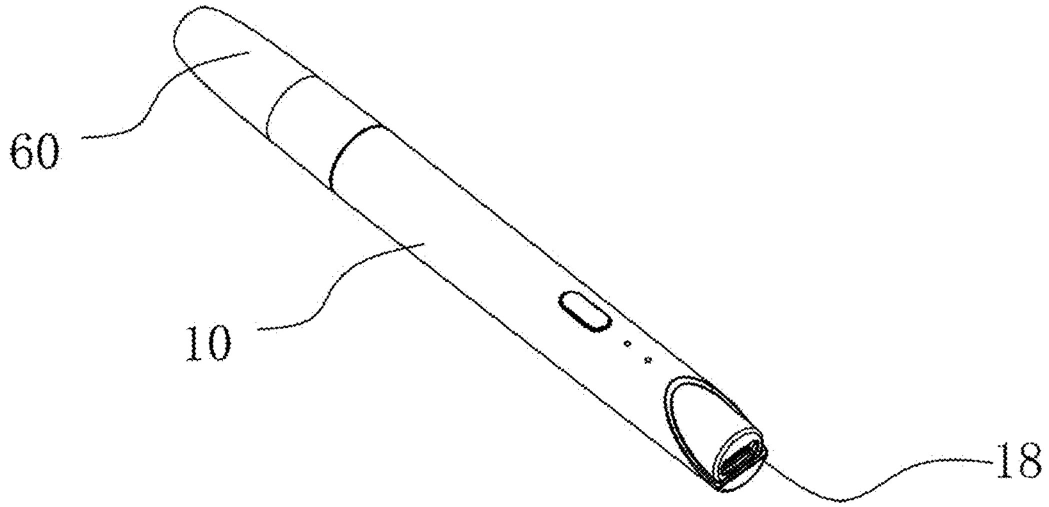
FIG. 1 is a first structural view of a visual nasal hair trimmer according to some embodiments of the present disclosure.

Specific explanations are made for the preferred embodiments provided by the present disclosure according to the attached drawings.

FIGS. 1-9 show some embodiments of a visual nasal hair trimmer provided by the present disclosure. As shown in FIGS. 1-9, the visual nasal hair trimmer includes a housing 10. A protective cover 20 is arranged at one end of the housing 10. The protective cover 20 defines a plurality of nasal hair grooves 21 for nasal hairs to enter. A trimming cutter 30 is arranged in the protective cover 20, and is configured to trim the nasal hairs in the plurality of nasal hair grooves 21. A rotary driver 40 is arranged in the housing 10, connected to the trimming cutter 30, and is configured to drive the trimming cutter 30 to rotate. The rotary driver 40 is connected to a main control module 11. The main control module 11 is connected to a camera 12. The main control module 11 is configured to transmit an image signal collected by the camera 12 to a handheld terminal. The camera 12 is located in a central cavity of the trimming cutter 30. The protective cover 20 defines a shooting hole 22 for the camera 12 to take pictures. The other end of the housing 10 is a handle end. The user can hold the other end of the housing 10 and insert the protective cover 20 into the nostril. The camera 12 obtains internal images of the nostril through the protective cover 20 and the trimming cutter 30 which are hollowed out. The main control module 11 transmits the image signal collected by the camera 12 to the handheld terminal. The user can monitor the internal condition of the nasal cavity in real time through the handheld terminal during a process of trimming nasal hairs, thereby facilitating precise trimming of nasal hairs and improving the user experience. The housing 10 is further movably fitted with a cover 60. The cover 60 sleeves the one end of the housing 10, playing a protective role.

The protective cover 20 includes a cover body 23. The trimming cutter 30 is located in the cover body 23. A top end of the cover body 23 defines the shooting hole 22 corresponding to the camera 12. The plurality of nasal hair grooves 21 are defined in a side wall of the cover body 23. In this way, the protective cover 20 is entirely in a shape of a hollow circular mesh, which is convenient for the nasal hairs to extend into the plurality of nasal hair grooves 21, and can prevent puncturing the nasal cavity when inserted into the user's nostril and trimming the nasal hairs. The cover body 23 is cylindrical. The cover body 23 is arranged with a plurality of protection strips 231. Each of the plurality of nasal hair grooves 21 is defined between respective two adjacent protection strips 231 of the plurality of protection strips 231. An extending direction of the each of the plurality of nasal hair grooves 21 is along a length direction of the housing 10. The plurality of protection strips 231 are bent inward to form a plurality of bent sections, each of the plurality of bent sections is at a top of a respective one of the plurality of protection strips 231, and the plurality of bent sections cooperatively define the shooting hole 22 corresponding to the camera 12 at a center of the cover body 23.In this way, the plurality of protection strips 231 of the cover body 23 are arranged in a petal like shape, forming the plurality of nasal hair grooves 21, which are convenient for nasal hairs to enter and do not affect the camera 12 from obtaining the internal image of the nostril.

The trimming cutter 30 includes a blade holder 31. The blade holder 31 has a central cavity 301 corresponding to the shooting hole 22. The camera is located in the central cavity 301. The blade holder 31 is arranged with at least one movable blade 32 for trimming the nasal hairs in the plurality of nasal hair grooves 21. In this way, when the rotary driver 40 drives the trimming cutter 30 to rotate, the at least one movable blade 32 of the blade holder 31 rotates, and the nasal hairs in the plurality of nasal hair grooves 21 can be quickly trimmed. The blade holder 31 includes a holder body 311. The holder body 311 is arc shaped. A top of the holder body 311 is arranged with at least one upper support arm 312. Each of the at least one upper support arm 312 is arranged with a respective one of the at least one movable blade 32. A bottom of the holder body 311 is arranged with at least one lower support arm 313. The at least one lower support arm 313 is arranged with at least one positioning seat 33 in a one-to-one correspondence. In this way, the trimming cutter 30 is arranged in a hollow structure, which is convenient for the camera 12 to directly aim at a trimming area in the nasal cavity through a center of the trimming cutter 30. The protective cover 20 in the shape of the hollow circular mesh is arranged outside the trimming cutter 30. The at least one movable blade 32 is located in the hollow circular mesh, and configured to trim the nasal hairs by rotating or reciprocating motion. A hollow part of the trimming cutter 30 ensures that a view of the camera 12 is not blocked, and moreover protects the lens from being blocked by hairs or other foreign objects. A side part of the each of the at least one upper support arm 312 can be bent and extended to form the respective one of the at least one movable blade 32. In this way, the each of the at least one upper support arm 312 and the respective one of the at least one movable blade 32 are connected to each other as a whole, ensuring strength of the at least one movable blade 32.

The rotary driver 40 is connected to the trimming cutter 30 through an eccentric transmission mechanism 50. The eccentric transmission mechanism 50 includes a driving gear 51 that is configured to rotate synchronously with a rotating shaft of the rotary driver 40, a transmission gear set 52 meshed with the driving gear 51, a driven gear seat 53 meshed with the transmission gear set 52. The driven gear seat 53 is connected to a rotating drum 54 that is configured to rotate synchronously with the driven gear seat 53. The trimming cutter 30 is mounted on the rotating drum 54. The transmission gear set 52 is arranged on a side of the driving gear 51. The transmission gear set 52 includes a first gear 521 meshed with the driving gear 51, a second gear 522 meshed with the driven gear seat 523, and a transmission shaft 523 that connects the first gear 521 with the second gear 522. In this way, when the rotating shaft of the rotary driver 40 drives the driving gear 51 to rotate, the driving gear 51 drives the first gear 521 to rotate, the first gear 521 drives the second gear 522 coaxial to the first gear 521 to rotate, the second gear 522 drives the driven gear seat 53 to rotate, and the driven gear seat 53 drives the rotating drum 54 to rotate synchronously, thereby driving the trimming cutter 30 mounted on the rotating drum 54 to rotate, realizing that the rotary driver 40 drives the trimming cutter 30. In the eccentric transmission mechanism 50, the transmission gear set 52 is arranged on a side of the driving gear 51, the driven gear seat 53 and the driving gear 51 are arranged on a same axis, and the rotary driver 40 is a motor. In this way, power of the motor is transmitted to the driven gear seat 53 and the trimming cutter 30 through the transmission gear set 52. In this manner, vibration of the trimming cutter 30 can be reduced, thereby improving trimming stability, and the eccentric transmission mechanism 50 is arranged to avoid interfering with a circuit of the camera 12, ensuring that transmission and imaging functions can be synchronously performed.

Figure 3:
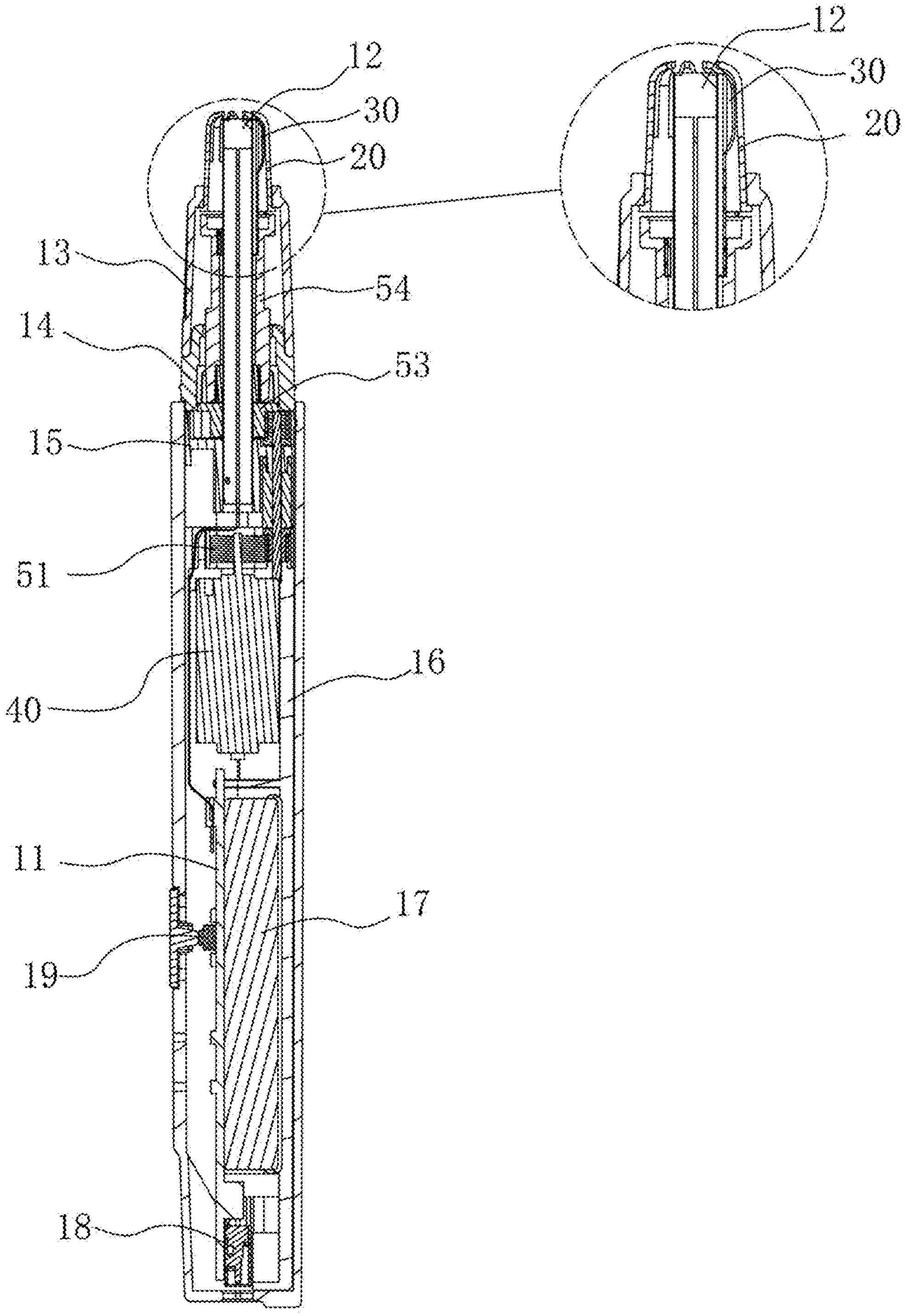
FIG. 3 is a sectional view of the visual nasal hair trimmer according to some embodiments of the present disclosure.
Figure 4:
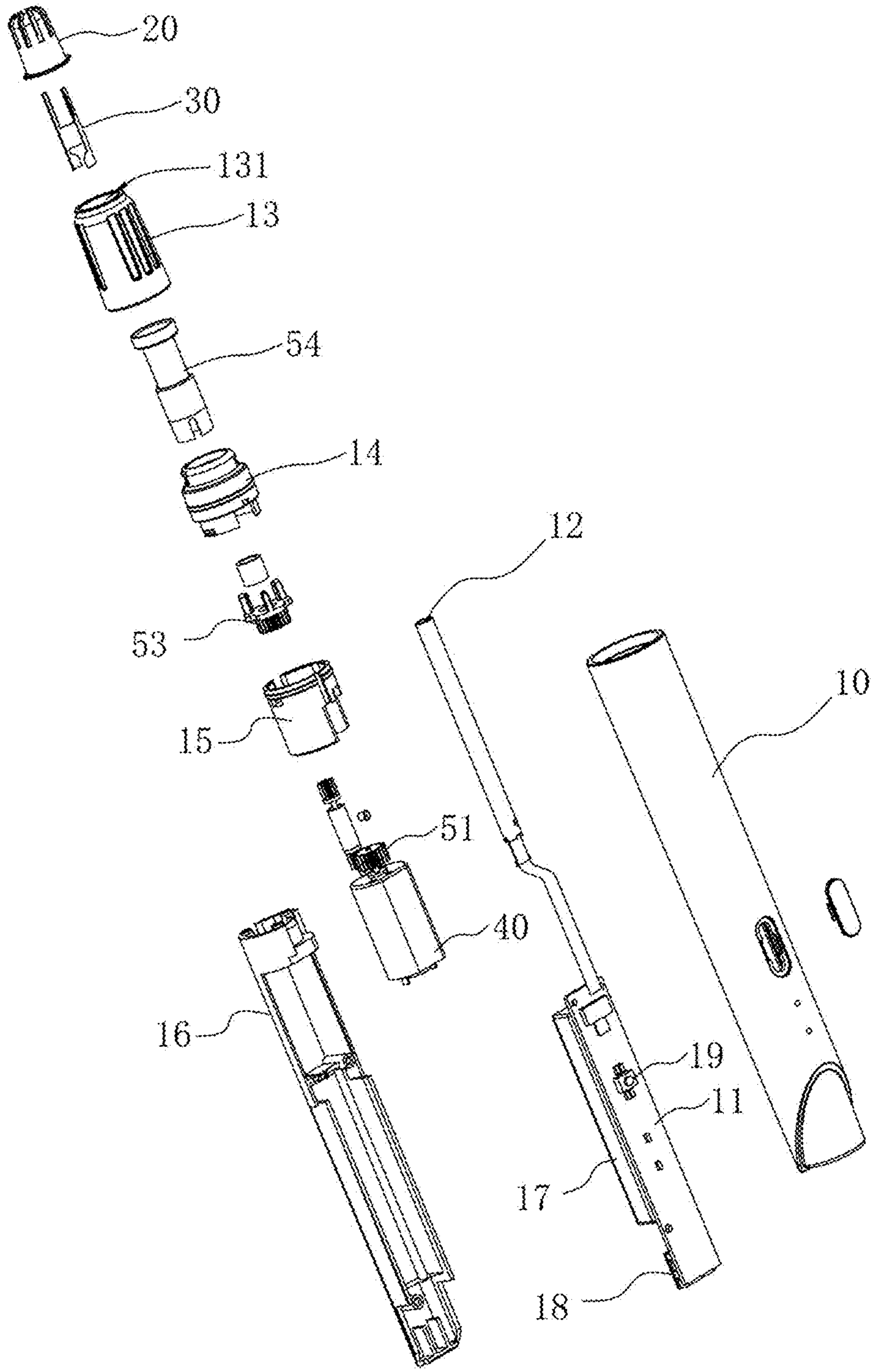
FIG. 4 is an exploded view of the visual nasal hair trimmer according to some embodiments of the present disclosure.
Figure 5:
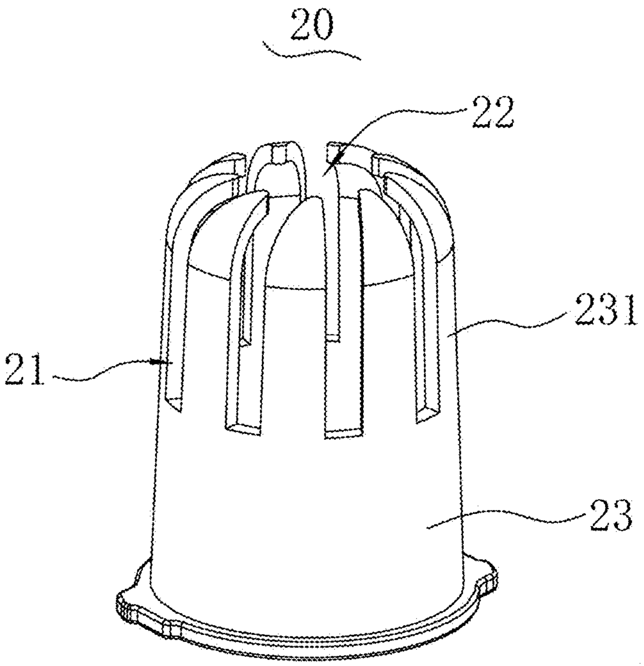
FIG. 5 is a structural view of a protective cover of the visual nasal hair trimmer according to some embodiments of the present disclosure.
Figure 6:
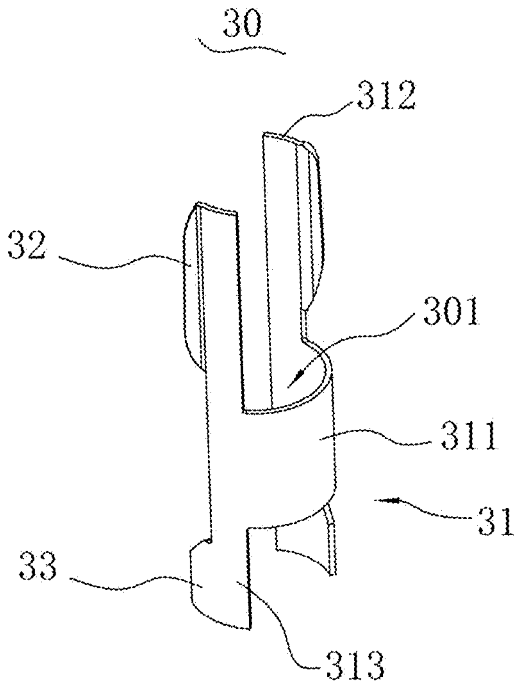
FIG. 6 is a structural view of a trimming cutter of the visual nasal hair trimmer according to some embodiments of the present disclosure.
Figure 7:
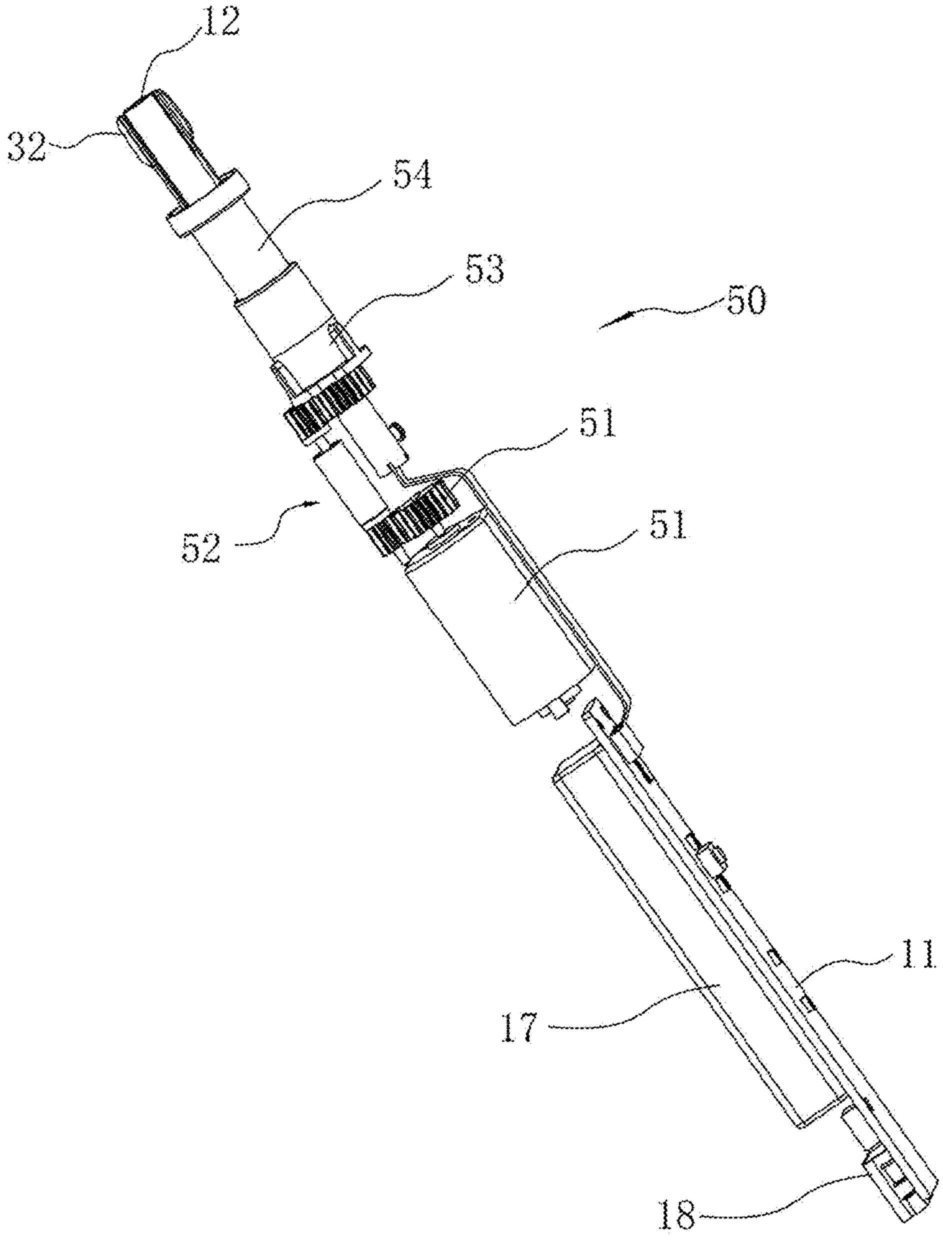
FIG. 7 is a structural view of an eccentric transmission mechanism of the visual nasal hair trimmer according to some embodiments of the present disclosure.
Figure 8:
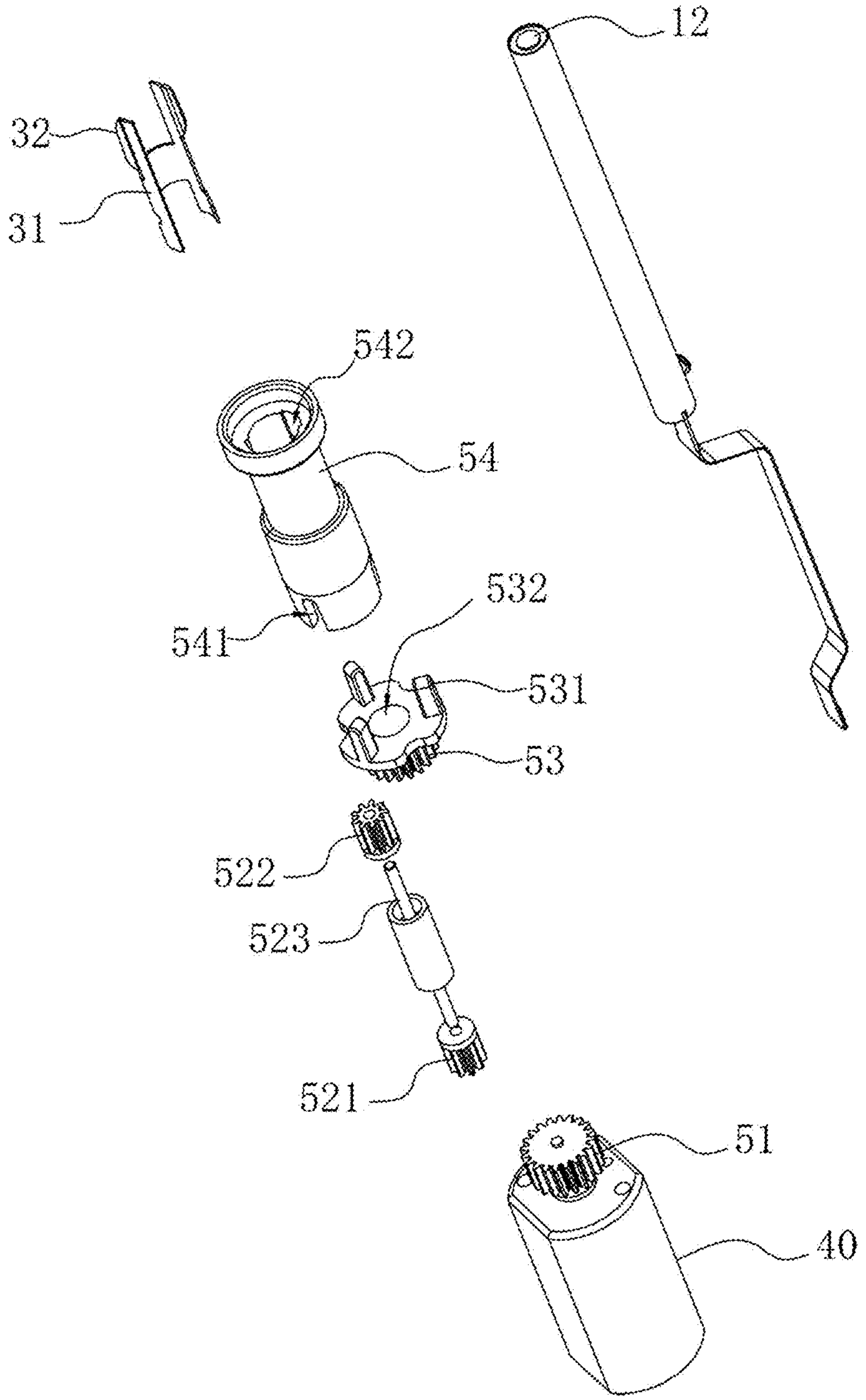
FIG. 8 is an exploded view of the eccentric transmission mechanism of the visual nasal hair trimmer according to some embodiments of the present disclosure.

The driven gear seat 53 is arranged with at least two connecting posts 531. A bottom of the rotating drum 54 defines at least two connecting grooves 541 corresponding to the at least two connecting posts 531. A top end of the rotating drum 54 defines at least one positioning groove 542 for positioning the trimming cutter 30. A bottom of the blade holder 31 of the trimming cutter 30 is arranged with the at least one positioning seat 33 that cooperates with the at least one positioning groove 542. A top of the blade holder 31 of the trimming cutter 30 is arranged with the at least one movable blade 32. In this way, the driven gear seat 53, the rotating drum 54, and the trimming cutter 30 are connected with each other as a whole. When the rotary driver 40 rotates, the driven gear seat 53 is driven to rotate, thereby driving the trimming cutter 30 to rotate at a high speed. As shown in FIGS. 3-4, the number of the at least one lower support arm 313 is two, the trimming cutter 30 is arranged with the two lower support arms 313. The number of the at least one positioning seat 33 is two. Each of the two lower support arms 313 is arranged with a respective one of the two positioning seats 33. The number of the at least one positioning groove 542 is two. The rotating drum 54 defines the two positioning grooves 542. When each of the two positioning seats 33 is matched with a respective one of the two positioning grooves 542, the two positioning seats 33 can be prevented from falling off easily.

Figure 2:
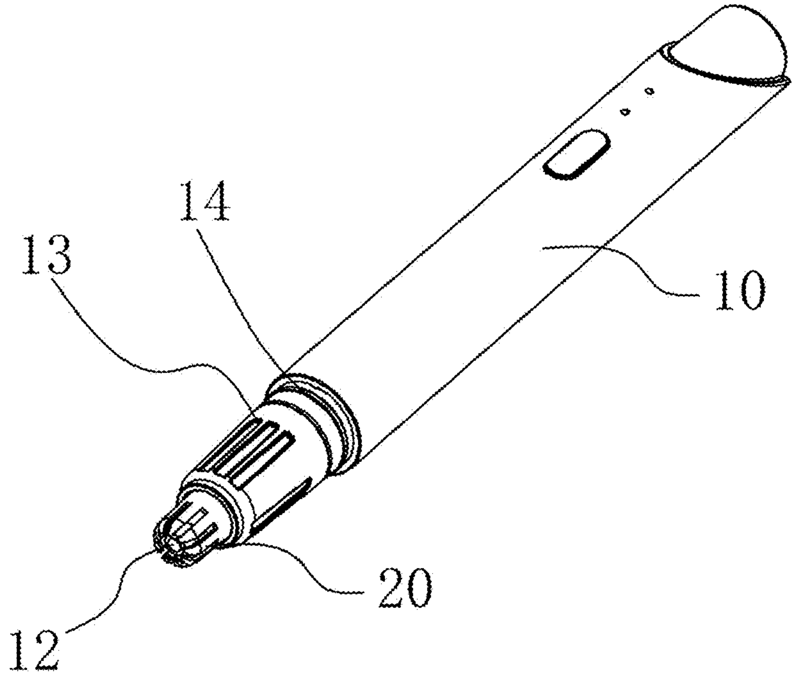
FIG. 2 is a second structural view of the visual nasal hair trimmer according to some embodiments of the present disclosure.
Figure 9:
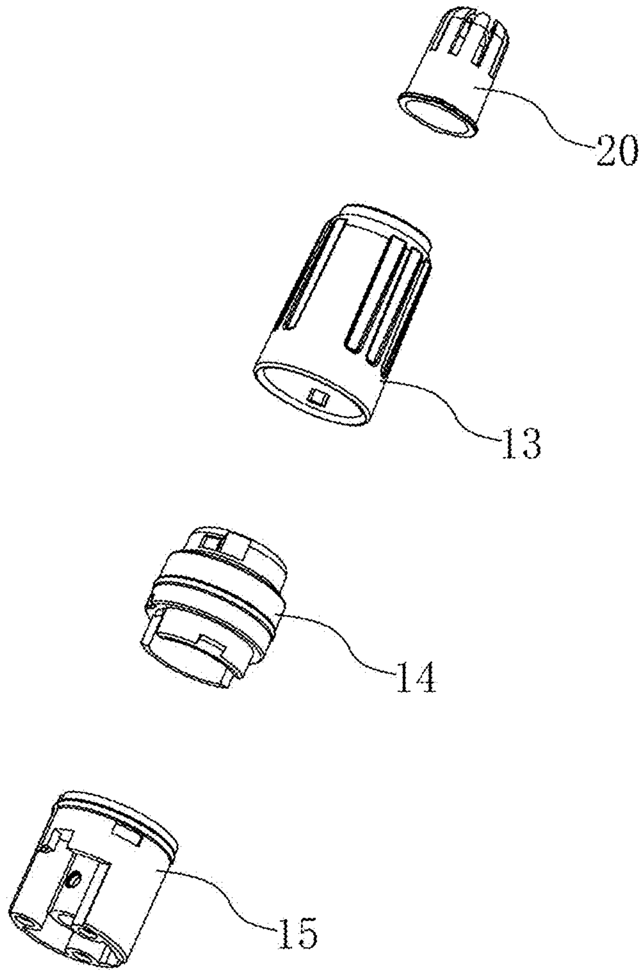
FIG. 9 is a structural view of a cutter head base, an external connection base, and an internal connection base of the visual nasal hair trimmer according to some embodiments of the present disclosure.

As shown in FIGS. 2 and 9, one end of the housing 10 is movably mounted with a cutter head seat 13 through an external connection seat 14. The protective cover 20 is mounted on the cutter head seat 13. The plurality of protection strips 231 of the protective cover 20 pass through a cutter head hole 131 of the cutter head seat 13. An internal connection seat 15 and a mounting bracket 16 is arranged in the housing 10. The internal connection seat 15 is movably connected to the external connection seat 14. The rotary driver 40 is arranged on the mounting bracket 16. In this way, it is convenient to remove the cutter head seat 13 and the external connection seat 14, which is convenient for cleaning the protective cover 20 and the trimming cutter 30. A bottom of the cover body 23 of the protective cover 20 is arranged with a retaining ring. The cutter head seat 13 defines a clamping groove for receiving the retaining ring. The cutter head seat 13 is movably connected to the external connection seat 14 in a clamping manner. The external connection seat 14 is movably clamped to the internal connection seat 15. The internal connection seat 15 and the mounting bracket 16 are clamped in the housing 10.

In the eccentric transmission mechanism 50, the driving gear 51 and the first gear 521 are arranged at a front end of the mounting bracket 16. The transmission shaft 523 passes through the internal connection seat 15. The second gear 522 and the driven gear seat 53 are arranged at a front end of the internal connection seat 15. The at least two connecting posts 531 of the driven gear seat 53 are inserted into the external connection seat 14. The rotating drum 54 passes through the external connection seat 14 and extends into the cutter head seat 13. The driven gear seat 53 defines a through hole 532 for an electrical connection line of the camera 12 to pass through, so as to position the eccentric transmission mechanism 50 and ensure stable transmission.

The other end of the housing 10 is a handle end, which is designed in a cylindrical shape for easy gripping. The main control module 11 is further connected to a battery 17, a charging interface 18, and a button 19. The charging interface 18 is arranged at the other end of the housing 10. The button 19 is a power button. The button 19 is arranged on the housing 10, which is convenient for the user to charge and use at any time. The main control module 11 transmits the image signal to the handheld terminal by means of wireless transmission. Specifically, WIFI transmission or Bluetooth transmission can be adopted.

The camera 12 is a miniature camera with high-definition imaging function and is connected to the handheld terminal in a wireless manner. After the user downloads and installs an APP, a real time video in the nasal cavity can be viewed on the handheld terminal. The APP has a video adjustment function, and can also record videos and take pictures in the nasal cavity, has a mirror window, can turn off a camera light, view recorded videos and taken pictures, etc. The user can adjust, turn on or off the camera light, and can also adjust a brightness of the camera light according to a condition in the user's nasal cavity to ensure that an interior of the nasal cavity can be clearly seen under various lighting conditions.

Operation steps and working modes of the visual nasal hair trimmer: (1) Short press to enter a start and connect mode: The user presses the button 19 once briefly, then the visual nasal hair trimmer starts and establishes communication with the APP through a wireless connection. At this time, a real time image of the nasal cavity may be displayed on a screen of the mobile phone screen for the user to observe the condition in the nasal cavity. (2) Press again briefly to enter a shaving mode: In a display mode, the user presses the button 19 again briefly. The visual nasal hair trimmer enters the shaving mode. At this time, the trimming cutter 30 starts to rotate or reciprocate. The user observes a trimming process through the screen to ensure accurate trimming. (3) Press again briefly to exit the shaving mode: After the trimming is completed, the user presses the button 19 again briefly. Then the trimming cutter 30 stops running, and the visual nasal hair trimmer returns to a single screen display mode. The user can continue to observe the nasal cavity through the camera 12 to confirm whether further trimming is required. The shaving mode and the single screen display mode are cyclical. (4) Long press to turn off mode: When an operation is completed, the user can long press the button 19 for two seconds. Then the visual nasal hair trimmer disconnects from the mobile phone, the camera 12 and the trimming cutter 30 are turned off at the same time, and the visual nasal hair trimmer enters a shutdown state.

The visual nasal hair trimmer can be maintained and cleaned as follows. The trimming cutter 30 and the camera 12 are both designed to be detachable, which is convenient for cleaning. The trimming cutter 30 and the protective cover 20 can be directly rinsed in water, while the camera 12 needs to be gently wiped with a dry cloth to avoid water from entering the camera 12. It is necessary to charge the visual nasal hair trimmer regularly to ensure sufficient battery power.

To sum up, the technical solution of the present disclosure can fully and effectively achieve the above-mentioned invention purposes. Moreover, the structure and functional principles of the present disclosure have been fully verified in the embodiments, and can achieve the expected effects and purposes. Without departing from the principles and essence of the present disclosure, various changes or modifications can be made to the embodiments of the disclosure. Therefore, the present disclosure includes all replacement contents within the scope of the present disclosure. Any equivalent changes made within the scope of the present disclosure fall within the scope of the present disclosure.

What is claimed is:

1. A visual nasal hair trimmer, comprising a housing, wherein a protective cover is mounted at one end of the housing and defines a plurality of nasal hair grooves; a trimming cutter is arranged in the protective cover and is configured to trim nasal hairs in the plurality of nasal hair grooves; a rotary driver is arranged in the housing, connected to the trimming cutter, and configured to drive the trimming cutter to rotate; the rotary driver is connected to a main control module, the main control module is connected to a camera and is configured to transmit an image signal collected by the camera to a handheld terminal; the camera is located in a central cavity of the trimming cutter, and the protective cover defines a shooting hole for the camera to shoot wherein the rotary driver is connected to the trimming cutter through an eccentric transmission mechanism; the eccentric transmission mechanism comprises a driving gear rotating synchronously with a rotating shaft of the rotary driver, a transmission gear set meshed with the driving gear, and a driven gear seat meshed with the transmission gear set; the driven gear seat is connected to a rotating drum configured to rotate synchronously with the driven gear seat, and the trimming cutter is mounted on the rotating drum; the transmission gear set is arranged on a side of the driving gear, and the driven gear seat and the driving gear are arranged on a same axis.

2. The visual nasal hair trimmer as claimed in claim 1, wherein the protective cover includes a cover body, the trimming cutter is located in the cover body, a top of the cover body defines the shooting hole corresponding to the camera, and a side wall of the cover body defines the plurality of nasal hair grooves; the trimming cutter comprises a blade holder; the blade holder defines a central cavity corresponding to the shooting hole, and the camera is located in the central cavity; the blade holder is arranged with at least one movable blade, and the at least one movable blade is configured to trim nasal hairs entering the plurality of nasal hair grooves.

3. The visual nasal hair trimmer as claimed in claim 2, wherein the cover body is arranged with a plurality of protection strips, each of the plurality of nasal hair grooves is formed between respective two adjacent protection strips of the plurality of protection strips, the plurality of protection strips are bent inward to form a plurality of bent sections, each of the plurality of bent sections is at a top of a respective one of the plurality of protection strips, and the plurality of bent sections cooperatively define the shooting hole corresponding to the camera at a center of the cover body.

4. The visual nasal hair trimmer as claimed in claim 2, wherein the blade holder includes a holder body, the holder body is arc shaped, a top of the holder body is arranged with at least one upper support arm, each of the at least one upper support arm is arranged with a respective one of the at least one movable blade, a bottom of the holder body is arranged with at least one lower support arm, and each of the at least one lower support arm is arranged with a positioning seat for mounting.

5. The visual nasal hair trimmer as claimed in claim 2, wherein the driven gear seat is arranged with at least two connecting posts, a bottom of the rotating drum defines at least two connecting grooves, and each of the at least two connecting posts corresponds to a respective one of the at least two connecting grooves; a top of the rotating drum defines at least one positioning groove for positioning the trimming cutter, a bottom of the blade holder of the trimming cutter is arranged with at least one positioning seat, and each of the at least one positioning seat matches a respective one of the at least one positioning groove; a top of the blade holder of the trimming cutter is arranged with the at least one movable blade.

6. The visual nasal hair trimmer as claimed in claim 2, wherein a cutter head seat is movably mounted at the one end of the housing through an external connection seat, the protective cover is mounted on the cutter head seat, and the plurality of protection strips of the protective cover pass through a cutter head hole of the cutter head seat; an internal connection seat and a mounting bracket are arranged in the housing, the internal connection seat is movably connected to the external connection seat, and the rotary driver is arranged on the mounting bracket.

7. The visual nasal hair trimmer as claimed in claim 1, wherein the main control module is connected to a battery, a charging interface, and a button, the charging interface is arranged at the other end of the housing, and the button is arranged on the housing.

8. The visual nasal hair trimmer as claimed in claim 1, wherein the main control module is configured to transmit the image signal to the handheld terminal by means of wireless transmission.

9. The visual nasal hair trimmer as claimed in claim 1, wherein the housing is movably fitted with a cover body, and the cover body sleeves the one end of the housing.

* * * * *